(12) United States Patent
Weatherhead et al.

(10) Patent No.: US 7,684,877 B2
(45) Date of Patent: Mar. 23, 2010

(54) STATE PROPAGATION FOR MODULES

(75) Inventors: N. Andrew Weatherhead, Ayr (CA); Mark K. Carmount, Ayr (CA)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 158 days.

(21) Appl. No.: 11/864,664

(22) Filed: Sep. 28, 2007

(65) Prior Publication Data
US 2008/0097624 A1 Apr. 24, 2008

Related U.S. Application Data

(60) Provisional application No. 60/862,403, filed on Oct. 20, 2006, provisional application No. 60/890,973, filed on Feb. 21, 2007.

(51) Int. Cl.
G05B 11/01 (2006.01)
G05B 13/02 (2006.01)
G05B 15/00 (2006.01)
G06F 11/00 (2006.01)

(52) U.S. Cl. .............................. 700/21; 700/17; 700/19; 700/28; 700/79; 700/83; 714/2; 714/25; 714/30; 714/47; 718/1

(58) Field of Classification Search .................. 700/17, 700/19, 21, 28, 31, 78–79, 83; 714/5, 25, 714/30, 47; 718/1
See application file for complete search history.

(56) References Cited

U.S. PATENT DOCUMENTS

| | | | |
|---|---|---|---|
| 4,215,396 A | | 7/1980 | Henry |
| 4,519,027 A | | 5/1985 | Vogelsberg |
| 4,570,217 A | * | 2/1986 | Allen et al. .................... 700/83 |
| 4,910,691 A | | 3/1990 | Skeirik |
| 5,058,043 A | | 10/1991 | Skeirik |
| 5,068,778 A | | 11/1991 | Kosem et al. |
| 5,214,577 A | | 5/1993 | Sztipanovits et al. |
| 5,255,197 A | | 10/1993 | Iida |
| 5,262,954 A | | 11/1993 | Fujino et al. |
| 5,388,318 A | | 2/1995 | Petta |
| 5,420,977 A | | 5/1995 | Sztipanovits et al. |
| 5,450,346 A | | 9/1995 | Krummen et al. |
| 5,555,179 A | | 9/1996 | Koyama et al. |
| 5,673,194 A | | 9/1997 | Cipelletti et al. |

(Continued)

FOREIGN PATENT DOCUMENTS

EP 1770464 4/2007

OTHER PUBLICATIONS

OA mailed May 6, 2009 for U.S. Appl. No. 11/864,678, 22 pages.

(Continued)

*Primary Examiner*—Ramesh B Patel
(74) *Attorney, Agent, or Firm*—Turocy & Watson LLP; William R. Walbrun

(57) ABSTRACT

A system facilitates state processing in an industrial control environment is provided. The system includes a module component to facilitate control operations in an industrial control environment. A propagation component is embedded within the module component to communicate state information to at least one other module component. The state information is communicated in an upward or downward direction according to a hierarchical module configuration.

25 Claims, 11 Drawing Sheets

U.S. PATENT DOCUMENTS

| | | | |
|---|---|---|---|
| 5,751,582 | A | 5/1998 | Saxena et al. |
| 5,920,717 | A | 7/1999 | Noda |
| 5,946,212 | A | 8/1999 | Bermon et al. |
| 6,008,985 | A | 12/1999 | Lake et al. |
| 6,289,252 | B1 | 9/2001 | Wilson et al. |
| 6,397,114 | B1 | 5/2002 | Eryurek et al. |
| 6,449,624 | B1 | 9/2002 | Hammack et al. |
| 6,459,944 | B1 | 10/2002 | Maturana et al. |
| 6,501,995 | B1 | 12/2002 | Kinney et al. |
| 6,527,018 | B2 | 3/2003 | Yamauchi et al. |
| 6,662,061 | B1 | 12/2003 | Brown |
| 6,675,324 | B2 * | 1/2004 | Marisetty et al. ............... 714/30 |
| 6,760,630 | B2 | 7/2004 | Turnaus et al. |
| 6,832,118 | B1 | 12/2004 | Heberlein et al. |
| 6,859,755 | B2 | 2/2005 | Eryurek et al. |
| 6,865,432 | B2 | 3/2005 | Brown |
| 6,996,741 | B1 * | 2/2006 | Pittelkow et al. ................. 714/5 |
| 7,058,712 | B1 | 6/2006 | Vasko et al. |
| 7,089,155 | B2 | 8/2006 | Hegel |
| 7,089,530 | B1 | 8/2006 | Dardinski et al. |
| 7,117,504 | B2 | 10/2006 | Smith et al. |
| 7,123,978 | B2 | 10/2006 | Hartman et al. |
| 7,149,595 | B2 | 12/2006 | D'Mura |
| 7,162,534 | B2 | 1/2007 | Schleiss et al. |
| 7,249,356 | B1 | 7/2007 | Wilson et al. |
| 7,254,457 | B1 | 8/2007 | Chen et al. |
| 7,289,861 | B2 * | 10/2007 | Aneweer et al. ............ 700/110 |
| 7,307,986 | B2 | 12/2007 | Henderson et al. |
| 7,313,453 | B2 | 12/2007 | Kline |
| 7,415,708 | B2 * | 8/2008 | Knauerhase et al. ............ 718/1 |
| 7,424,331 | B2 * | 9/2008 | Patel ............................ 700/31 |
| 2001/0049562 | A1 | 12/2001 | Takano et al. |
| 2002/0010908 | A1 | 1/2002 | Cheng et al. |
| 2002/0042896 | A1 * | 4/2002 | Johnson et al. ................ 714/47 |
| 2003/0051071 | A1 | 3/2003 | Stefansson et al. |
| 2003/0177018 | A1 | 9/2003 | Hughes |
| 2004/0095833 | A1 * | 5/2004 | Marisetty et al. ............. 365/222 |
| 2004/0158713 | A1 * | 8/2004 | Aneweer et al. ............. 713/166 |
| 2004/0172612 | A1 | 9/2004 | Kasravi et al. |
| 2004/0181294 | A1 | 9/2004 | Deitz et al. |
| 2004/0243260 | A1 | 12/2004 | Law et al. |
| 2005/0015769 | A1 | 1/2005 | Gegner |
| 2005/0227217 | A1 | 10/2005 | Wilson |
| 2006/0101433 | A1 | 5/2006 | Opem et al. |
| 2006/0230383 | A1 | 10/2006 | Moulckers et al. |
| 2006/0265688 | A1 | 11/2006 | Carlson et al. |
| 2007/0089100 | A1 | 4/2007 | Morris et al. |
| 2007/0100486 | A1 * | 5/2007 | Burda et al. ................. 700/100 |
| 2007/0101193 | A1 * | 5/2007 | Johnson et al. ................ 714/25 |
| 2007/0162268 | A1 | 7/2007 | Kota et al. |
| 2007/0186090 | A1 | 8/2007 | Yu et al. |
| 2007/0261027 | A1 | 11/2007 | Dhanakshirur et al. |
| 2007/0269297 | A1 * | 11/2007 | Meulen et al. ......... 414/222.01 |
| 2008/0120129 | A1 | 5/2008 | Seubert et al. |
| 2008/0126407 | A1 | 5/2008 | Shimaoka et al. |
| 2008/0188960 | A1 * | 8/2008 | Nixon et al. .................. 700/86 |

OTHER PUBLICATIONS

OA mailed May 13, 2009 for U.S. Appl. No. 11/864,733, 23 pages.
OA mailed May 12, 2009 for U.S. Appl. No. 11/856,563, 30 pages.

* cited by examiner

STATE PROPAGATION FOR MODULES

CROSS REFERENCE TO RELATED APPLICATION

This application claims the benefit of U.S. Provisional Patent Application No. 60/862,403 entitled MODULE CONTROL AND STATE PROPAGATION, and filed on Oct. 20, 2006, the entirety of which is incorporated herein by reference. This application also claims the benefit of U.S. Provisional Patent Application No. 60/890,973 entitled MODULE CONTROL AND STATE PROPAGATION, and filed on Feb. 21, 2007, the entirety of which is incorporated herein by reference.

TECHNICAL FIELD

The claimed subject matter relates generally to industrial control systems and more particularly to modules that are adapted to propagate control information relating to reset, mode, and faults.

BACKGROUND

One type of industrial control process is referred to as a batch process, which involves subjecting raw materials to processing steps using one or more pieces of equipment to produce a "batch" of product. Efforts to automate batch processing have led to the formation of standards committees by members of industries involved in batch processing and suppliers of batch processing equipment, among others. The general purpose of these standards committees has been to define uniform standards for automated batch processing. One such standard has been promulgated by the International Society for Measurement and Control, an international organization concerned with issues of process control. This standard is entitled Batch Control Part 1: Models and Terminology and is often referred to as the ISA S88.01-1995 standard (or "S88" for purposes of this application). Although S88 was developed to describe batch processes, it has broad applicability to discrete and continuous processes.

The S88.01 standard defines models of equipment and procedures for use in automated batch processes, as well as terminology for use in referring to those models and their elements. The S88.01 standard defines a "batch process" as a process that leads to the production of finite quantities of material by subjecting quantities of input materials to an ordered set of processing activities over a finite period of time using one or more pieces of equipment. A "batch" is defined as the material that is being produced or has been produced by a single execution of a batch process.

Batch-processing equipment (i.e., controllable elements such as valves, heaters, mixers, and so forth) is operated according to procedures to produce a batch. Generally, such equipment is referred to synonymously as equipment, equipment modules, processing equipment, or physical elements. The procedures to operate such physical elements are often referred to by the S88.01 standard as the "procedural model." According to the S88.01 standard, the procedural model is structured as a hierarchical ranking of procedures, with the highest level encompassing each of the lower levels, the next highest level encompassing each of the levels below it, and so on. Typically, the levels of the S88.01 procedural model of a particular application are, in descending order: the "procedure;" the "unit procedure;" the "operation;" and the "phase."

The term "procedural element" generally refers to components that employ any of the levels of the S88.01 procedural model, not just to those of the "procedure" level or any other single level of the procedural model. The highest-level procedural element of interest is referred to as a procedure, which is made up of one or more unit procedures. Each unit procedure is in turn made up of one or more operations, which are each in turn made up of one or more phases. The S88.01 procedural model does not preclude definition and use of other hierarchical levels, nor does it require that each level be present in particular applications. Rather, the standard is intended to provide a broad, standardized model for describing the procedures followed in automated batch-process control.

Conventional control systems that employ standard process models such as S88 and the like are often composed of modules that operate various aspects of the systems. In general, there is a need to communicate status between the modules such as fault status, reset status, and mode such as automatic or manual. In order to achieve these communications, prior systems required designers to craft custom code between the respective modules for each installation.

SUMMARY

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

Propagation components that are embedded within modules to automatically process and communicate state information across multiple dimensions of a module hierarchy. These can include fault propagation components, reset propagation components, and mode propagation components for example. For instance, fault propagation can provide an embedded mechanism within each S88 aware module, Unit Module, Equipment Module, and Control Module, for example. This mechanism allows fault conditions to move the module up and down the module hierarchy, which allows higher level modules to perform the appropriate response to a fault condition. The component also allows fault acknowledgements to move down the hierarchy which mitigates the need to perform device level fault acknowledgements. By propagating faults, higher level modules are aware of fault conditions in subordinate modules. Reset and mode propagation along with other state processing can be provided in a similar manner.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

State propagation components are provided within a hierarchical architecture, where control information such as resets, faults, and/or mode changes are communicated up or down a hierarchy of modules. In one aspect, a system that facilitates state processing in an industrial control environment is provided. The system includes a module component to facilitate control operations in an industrial control environment. A propagation component is embedded within the module component to communicate state information to at least one other module component. The state information is communicated in an upward or downward direction according to a hierarchical module configuration.

It is noted that as used in this application, terms such as "component," "module," "model," and the like are intended to refer to a computer-related entity, either hardware, a combination of hardware and software, software, or software in execution as applied to an automation system for industrial control. For example, a component may be, but is not limited to being, a process running on a processor, a processor, an object, an executable, a thread of execution, a program and a computer. By way of illustration, both an application running on a server and the server can be components. One or more components may reside within a process and/or thread of execution and a component may be localized on one computer and/or distributed between two or more computers, industrial controllers, and/or modules communicating therewith.

Figure 1:
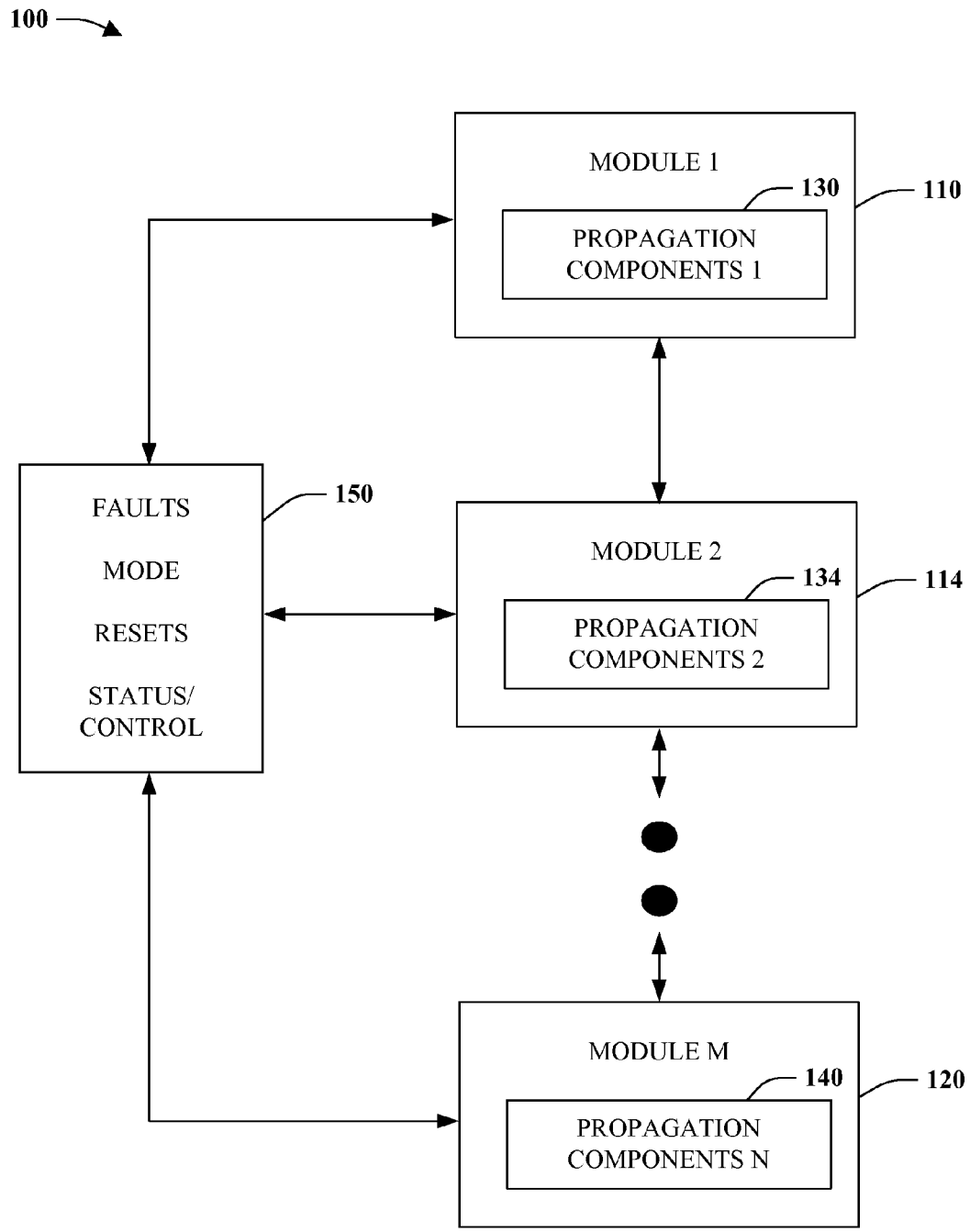
FIG. 1 is a schematic block diagram illustrating a module and propagation components for an industrial automation system.

Referring initially to FIG. 1, a system 100 illustrates a hierarchy of modules 110-120 and associated propagation components 130-140 for an industrial automation environment. The modules 110-120 are arranged in a hierarchy although a hierarchical arrangement is not required. In general, one or more control and status conditions are passed between the respective modules 110-120. Specifically, this can include fault, reset, mode or other status/control conditions at 150 that can be communicated and passed between members of the hierarchy of modules 110-120. The propagation components 130-140 are embedded within the modules 110-120 to facilitate efficient communications and control of such conditions. In contrast to prior systems, the propagation components 130-140 mitigate writing custom code for modules in order to process various states and events such as fault, mode, or reset. Faults are generally associated with some type of alarm or system/module error condition. Resets as the name implies return modules or systems to a starting condition and can be effectuated manually or via automated signals between modules 110-130. Modes generally relate to the operating mode of the system such as manual, automatic, or semi-automatic mode.

The propagation components 130-140 are embedded within the modules 110-120 in order to automatically process and communicate state information across multiple dimensions of a module hierarchy. These can include fault propagation components, reset propagation components, and mode propagation components for example. For instance, fault propagation can provide an embedded component within each S88 (or other process/discrete manufacturing model) aware module, Unit Module, Equipment Module, and Control Module, and so forth as will be described in more detail below. The propagation components 130-140 allows fault conditions to move the module up and down the module hierarchy, which allows higher level modules to perform the appropriate response to a fault condition. The propagation components 130-140 also allow fault acknowledgements to move down the hierarchy that mitigates the need to perform device level fault acknowledgements. By propagating faults, higher-level modules are aware of fault conditions in subordinate modules. Reset and mode propagation along with other state processing can be provided in a similar manner as will be described in more detail with respect to FIGS. 2-4.

The propagation components 130-140 can be provided with functional control modules such as a unit module but other modules can also receive and process such conditions or events. By adding such capability to the modules 110-120, code design during installation is mitigated since code does not have to be developed to process system states such as fault or reset. In one example, the modules 110-120 provide resident control for a unit where processing activities (e.g., mix a batch, perform discrete operation) can be performed. The unit can include vessels, tanks, work areas, or assembly points where a process is performed or discrete operation commences. The modules can include advanced functionality for reliable equipment control that includes the ability to generate and process state information such as reset, fault, mode, quality, availability, cleanliness and so forth which will be described in more detail below. In addition, a parent child relationship can be created with other subordinate equipment centric objects or modules (e.g., Control Modules, Equipment Modules), which provides increased communications functionality to the subordinate modules.

As will be described in more detail below, the module 110-120 can be an association of logic with one or more resources. The logic includes program code that can alter the state of a resource for example, ladder code, function chart, script, JAVA, C code, and so forth. The resources are those components or elements that perform an activity in a system including equipment and personnel that perform work in a system. Other examples of types of resources include Equipment, Material, Personnel, Segments and Storage. Personnel and equipment (machines) can perform activities in a system. Resources that can perform work can be classified as active resources (e.g., CNC machine, Injection molding machine), whereas other equipment resources can be considered passive resources (e.g., sensor, material). In general, the modules hide the user from internal interfaces, messages, and logic specific to the resources yet provide standard or generic interfaces to external systems or between components.

Modules may include other modules including nested modules where standard module behaviors and attribute patterns can be represented using common data model representations for module classes, module templates and module inheritance. Module classes and templates can be maintained in libraries which facilitate access to desired system functionality and further promote system integration. Resources can have various states associated therewith such as common S88 state classifications including idle, hold, abort, run, reset, stop, restart, and so forth where the module can present logic to represent state machines that manage the state of the resource. During application, resource modules (described below) can take on the name of the resource that is the primary focus on the module. For example, an Equipment module is primarily focused on coordination of equipment but may involve personnel in the process. Similarly, a Personnel module is focused on coordination of personnel but may involve other resources in the process. A Control Module that manages a material may be referred to as a Material Control Module and so forth.

In general, Ownership and Arbitration also provide propagation that is applicable when a relationship has been established between two or more modules. Modules may include methods or configuration functions to establish these relations. For example, if valve 1 has not established a relationship with tank 3, when valve 1 faults, then tank 3 is unaffected. Conversely if valve 1 has established a relationship with tank 3, when valve 1 faults, tank 3 is aware of this information. As an additional example, if a safety switch has not established a relationship with a safety zone, when the safety switch faults, then the safety zone is unaffected. Conversely if the safety switch has established a relationship with the safety zone, when the switch faults, then the safety zone is aware of this information.

It is noted that components associated with the system 100 can include various components that propagate safety data up and down the hierarchy including presence sensing devices, safety switches, interlock switches, safety relays, emergency stop devices, cable pulls & enabling switches, safety controllers, and so forth which are capable of interacting to form a safety system. Functional safety consists of at least two components SIL's (Safety Integrity Level) and PL's (performance levels)—as defined in industry standards dedicated to safety systems such as IEC61508, IEC61511, IEC 61326-3-1, IEC 61784-3. Safety systems are designed based on the key safety related parameters, such as Probability of Failure on demand, Spirius Trip Rate, Availability, Mean time between failure, fault tolerance, diagnostic coverage, systematic safety integrity and so forth. The individual components of a safety system may provide a mechanism to publish key safety data over a network to a controller, PLC for example. The PLC may then consume the safety data and dynamically calculate the overall safety parameters of a safety system. The safety system may then run a tuning algorithm to facilitate that the safety system remains within the parameters set for the certified SIL or PL.

It is noted that components associated with the system 100 can include various computer or network components such as servers, clients, programmable logic controllers (PLCs), communications modules, mobile computers, wireless components, control components and so forth which are capable of interacting across a network. Similarly, the term PLC as used herein can include functionality that can be shared across multiple components, systems, and/or networks. For example, one or more PLCs can communicate and cooperate with various network devices across the network. This can include substantially any type of control, communications module, computer, I/O device, sensor, Human Machine Interface (HMI) that communicate via the network which includes control, automation, and/or public networks. The PLC can also communicate to and control various other devices such as Input/Output modules including Analog, Digital, Programmed/Intelligent I/O modules, other programmable controllers, communications modules, sensors, output devices, and the like.

The network can include public networks such as the Internet, Intranets, and automation networks such as Control and Information Protocol (CIP) networks including DeviceNet and ControlNet. Other networks include Ethernet, DH/DH+, Remote I/O, Fieldbus, Modbus, Profibus, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 2:
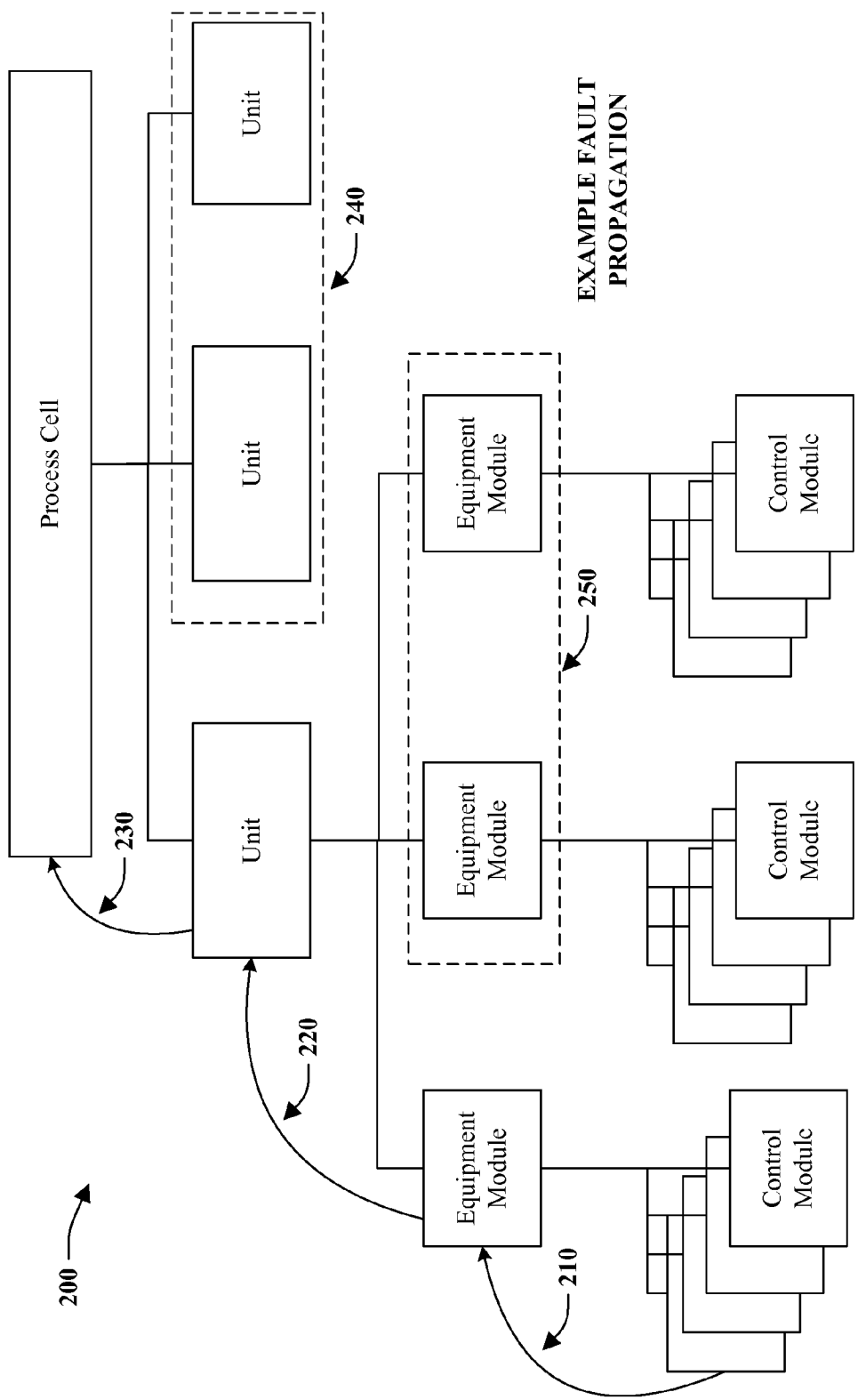
FIG. 2 is a block diagram illustrating example fault propagation.

Referring now to FIG. 2, system 200 illustrates an example fault propagation sequence where various modules provide components to automatically propagate and process a fault, mode, or reset command. At 210, a control module fault occurs. As an example, a valve fails to open, the control module is aware of its associated equipment module, and reports this failure to the equipment module at 210. Proceeding to 220, the equipment module detects the failure generated at 210, acts accordingly based on the failure, and reports the failure to its associated unit. At 230, the unit detects the failure, acts accordingly based on the failure, and reports the failure to its process cell. At 240, based on configuration information, other units that are associated to the process cell act accordingly to the failure received by the cell. At 250, based on configuration information, other equipment modules that are associated to this unit act accordingly to this failure.

Fault or other mode/reset propagation is provided along with other unit module extended features or functionality. In one aspect, the extended module features include processing, determining, and/or communicating performance data. This can include OEE data which is a formula to yield the overall performance of equipment (or a factory), governed by the cumulative impact of factors such as, the equipment's availability (percent of scheduled production time available), performance rate (percent of parts produced compared to standard) and quality (percent of sellable parts produced compared to parts started). Example performance data can include:

Last Batch Cycle Time
Average Batch Cycle Time
Time Held
Time Standby
Number of Times Held Current Batch
Number of Times Aborted Current Batch
Number of Faults Current Batch (all subordinate equipment)
Number of Faults Last Batch (all subordinate equipment)

The extended module features can also include monitor data. Generally, the module can monitor the current batch cycle time, and compare to a configured batch cycle time limit. The module can provide an indication when the batch cycle time is exceeded, for example. This capability can be enabled/disabled through a configuration parameter. The module provides the ability for campaign batching which includes a configuration parameter to enable/disable campaign batching. In another aspect, the module receives (from an operator, or external Logic), stores, and may provide campaign data, examples of campaign data are:

Campaign Count Preset
Campaign Count Actual
Last Batch
First Batch

This may also include processing batch cleanliness requirements, and establishing and providing an indication that the cleanliness requirements have been met. The module is capable of receiving, storing and making available batch data, examples of batch data are:

Product Name
Product ID
Recipe ID
Destination
Manufacturers Order Number
Quality Status may be provided, examples of quality status are:
Testing
Released
Held
Failed
Test Batch Other types of command processing can be provided. The module can accept requests from users, or external logic to hold the emptying of the unit. The module can provide such status to external logic, if desired. The module can also provide the ability to maintain a set amount of material at the end of the batch cycle for use in starting the next batch cycle and display, via a human machine interface (HMI), the current amount of material. The operator or external logic can modify the amount to be maintained. As can be appreciated, other types of commands, status, or parameters can be provided.

Figure 3:
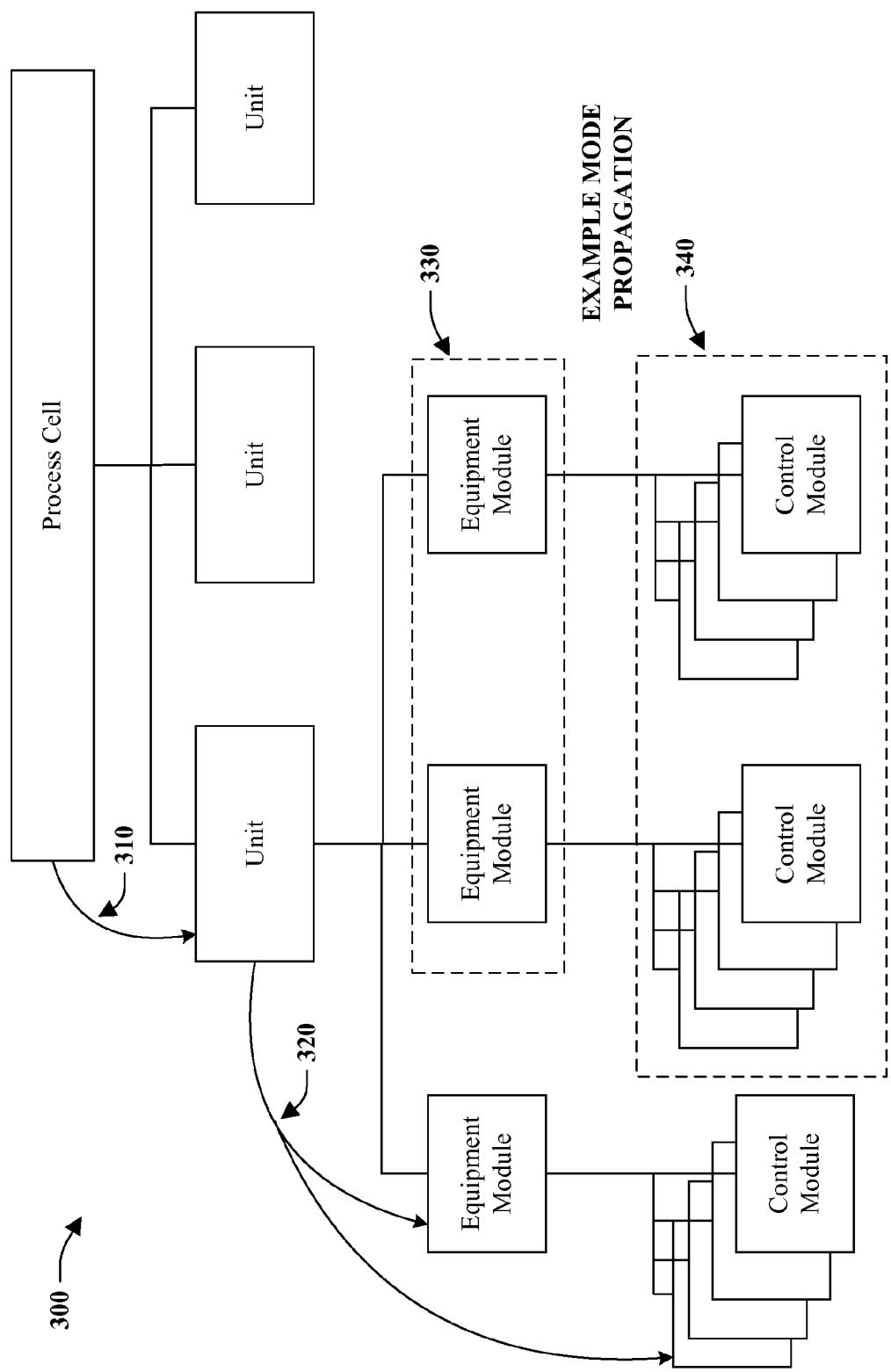
FIG. 3 is a block diagram illustrating example mode propagation.

Turning to FIG. 3, an example system 300 illustrates an example mode propagation sequence. Proceeding to 310, the highest level of the control architecture, such as the process cell, may set the mode status for the system. As an example, modes may include Auto, Semi-Auto and Manual. Based on configuration information in modules at a lower level in the hierarchy, such modules may inherit this mode from the module above. At 320, based on configuration information, the mode of the unit may be inherited by its subordinate equipment and control modules. At 330, other equipment modules that are also associated to the unit receiving the signal 310 may also inherit this mode information. Since this is configurable, the user has the ability to pick and choose which equipment modules will act in this manner.

At 340, other control modules that are also associated to this unit may also inherit the mode information. Since this is configurable, the user has the ability to pick and choose which control modules will act in this manner. It is noted that control modules typically have auto and manual modes. By placing the associated unit into manual mode, this "enables" the user to place the control module into manual mode. When the unit is placed back into auto mode, based on configuration, generally all subordinate equipment and control modules will be placed in back into auto mode.

A unit (or unit module) can operate in a hierarchy of modules. In one example, the unit interacts with a process cell with subordinate modules—an equipment module and a control module. A recipe phase and an equipment phase can be provided to drive the equipment module. As can be appreciated, other configurations of modules and/or other components can be provided than shown in the example system 300.

In one aspect, the unit can be defined as follows: Unit: A collection of associated control modules and/or equipment modules and other process equipment in which one or more major processing activities can be conducted. Generally, Units are presumed to operate on one batch at a time and operate relatively independently of one another. This term typically applies to both the physical equipment and the equipment entity. Examples of processing activities are react, crystallize, and create a solution. Software can also be constructed in a series of layers. These software layers can also be referred to as a hierarchy. Building a hierarchy within the software allows designers to better manage complex systems and to reuse portions of software from one project to another.

Figure 4:
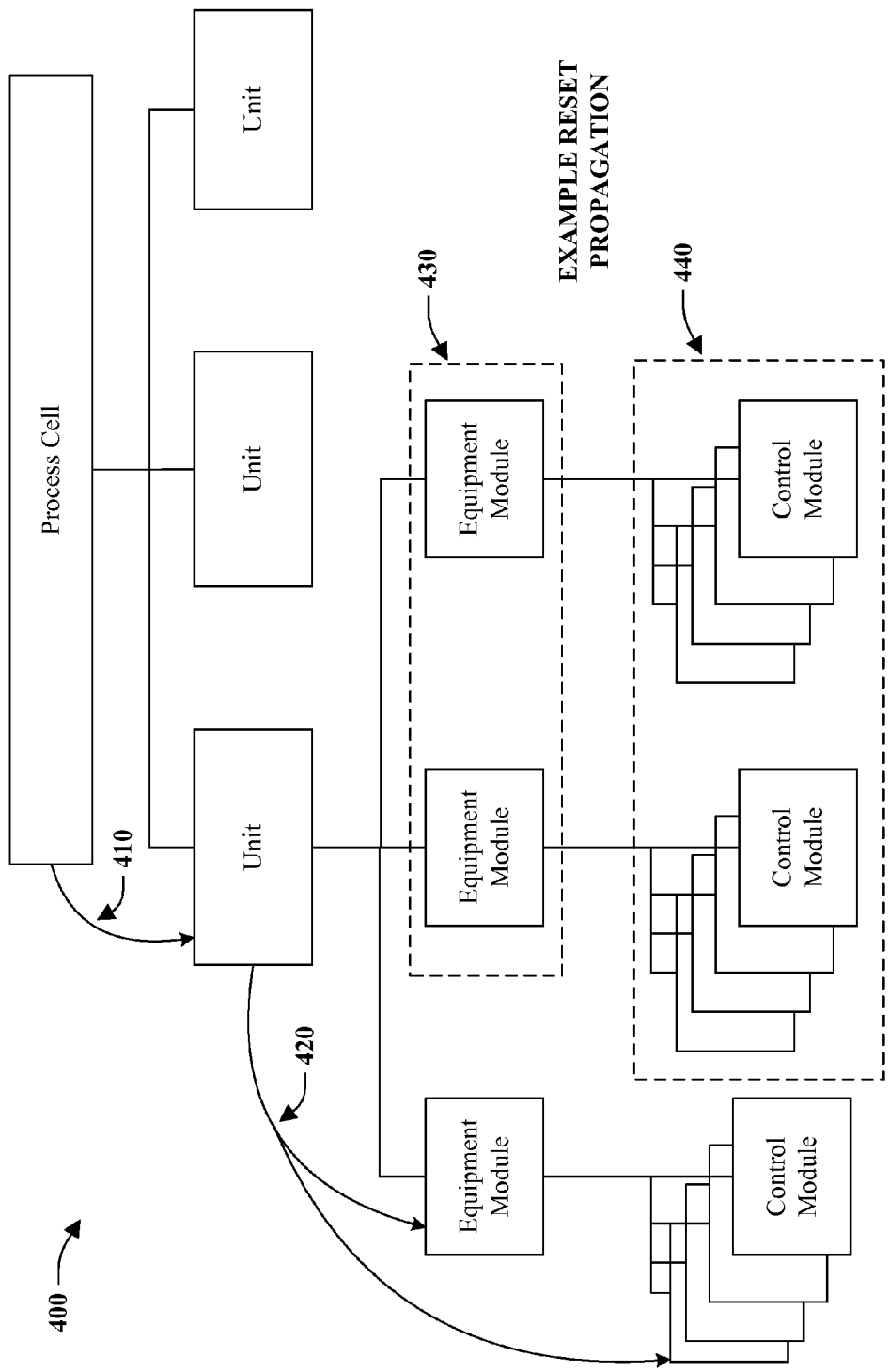
FIG. 4 is a block diagram illustrating example reset propagation.

Referring now to FIG. 4, a system 400 illustrates an example reset propagation sequence. At 410, the highest level of the control architecture, such as the process cell, may issue a reset request. As an example, a reset request may, set the mode to auto and acknowledge alarms. At 420, based on configuration information, the reset request at the unit or process cell level may be inherited by its subordinate equipment and control modules. At 430, other equipment modules that are also associated to the unit may also inherit the reset request. Since this is configurable the user has the ability to pick and choose which equipment modules will act in this manner. At 440, other control modules that are also associated to the unit may also inherit this reset request. Since this is configurable, the user has the ability to pick and choose which control modules will act in this manner. It is noted that each level of the control hierarchy may report back that the reset request is complete to the next highest level. This ultimately allows the originator of the reset request to determine that the request has been completed.

In one aspect, a module Data Structure can be provided for substantially any type of propagation sequence—be it reset, mode, fault, command and so forth. The unit module can be structured in a manner that allows an individual to easily find and understand information issued to and produced by the respective module. For example, commands can be grouped in a common section, status is given in a separate section, and configuration parameters are grouped together as well. Another unit module function includes state processing. Thus, the unit module can perform as a state machine for a particular grouping of equipment modules. The actual states can be defined during implementation. The states may be initiated by a procedure or operator, but the unit states do not have to follow the S88 state model although S88 states can be employed. An example state processing diagram is illustrated and described with respect to FIG. 5 below.

Mode processing can also be provided. Generally, the unit module functions via the control system in auto, semi-auto or manual mode. While in auto mode, the respective unit is under the control of the automation system. All direct control requests from the operator will generally be ignored. While in semi-auto mode, the unit may receive requests from an operator at the equipment phase or the equipment module level, for example. While in manual mode the unit may receive requests from an operator at the control module level, for example, where one or more commands can be provided. Typically, the unit module is commanded to a state or mode by automation commands or the operator. The unit module has the ability to transfer these states or modes to its associated Equipment Phases and Modules.

Module status can also be processed. As noted above, the unit module provides a set of predefined status values. A project specific area can also be created to allow the user to add additional status information. This status describes the vessel or unit. Status information can be grouped into the following example categories: Alarm; Availability; Cleanliness; Process; Quality; Campaign; and so forth. Fault and warning data can be provided by the unit module. For instance, the unit module can monitor fault conditions and generate suitable fault status when a failure occurs, where interlocks can be provided. If the process or safety interlocks are lost, the unit module can be de-energized. A process interlock bypass configuration can be provided to circumvent process interlocks for a device.

In another aspect, the unit module can be placed in a simulation mode. Simulation can also be achieved indirectly within subordinate Control Modules. Configuration includes modifying a unit module's configuration data, where the behavior of a particular module instance can be modified. When module configurations are considered valid, an individual of appropriate authorization level may save the current settings. If the unit module's configuration settings deviate from the saved setting, an indication can appear on the HMI faceplate or electronic message for example. An authorized individual can then save the current configurations or restore the previously saved configuration.

Figure 5:
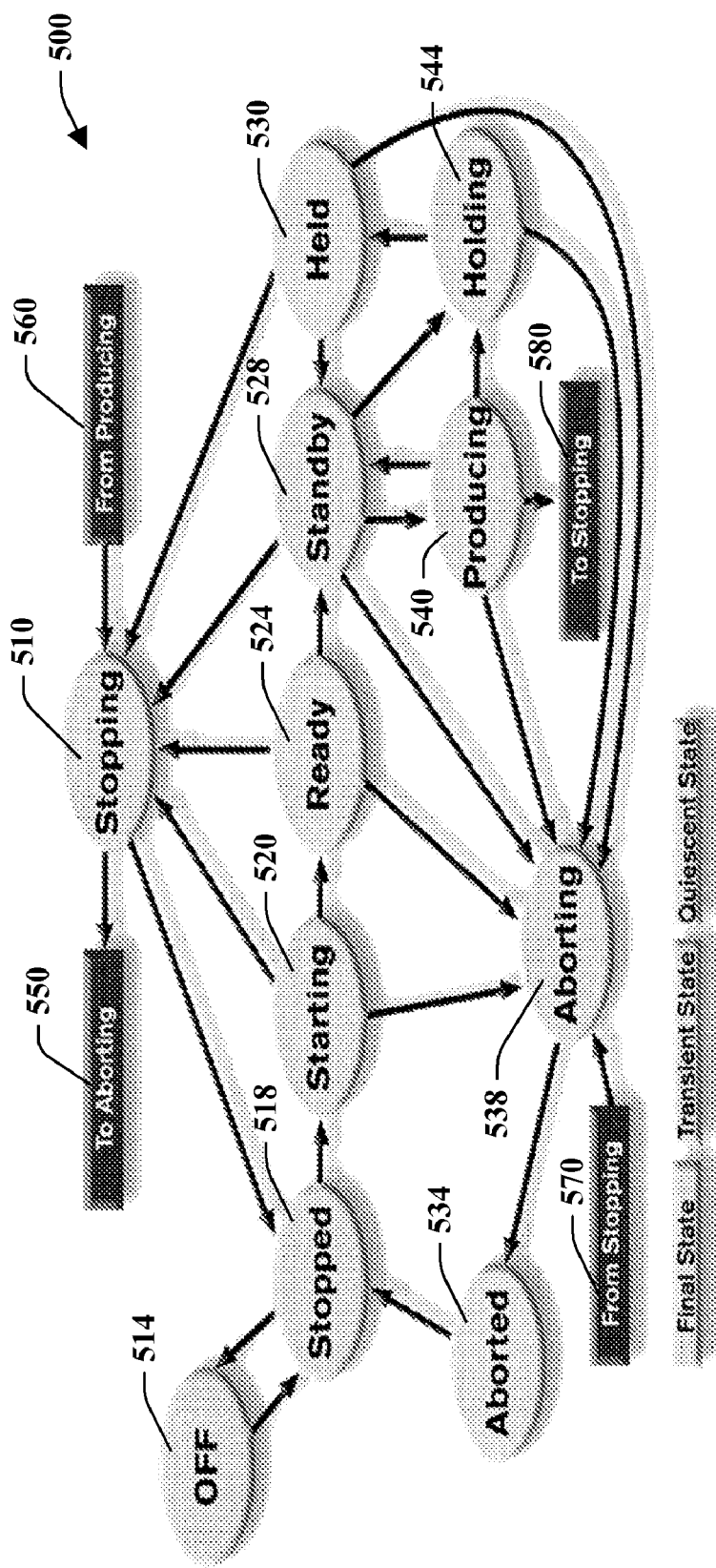
FIG. 5 illustrates an example module state machine.

Turning to FIG. 5, an example state machine processing diagram 500 is illustrated for a unit module. As shown, example states can include stopping 510, off 514, stopped 518, starting 520, ready 524, standby 528, and held 530. Other example states include aborted 534, aborting 538, producing 540, and holding 544. Ingress and Egress to the state diagram 500 can occur from other states such as to aborting 560, from producing 560, from stopping 570, and to stopping 580. Typically, unit module states are processed within a unit core module, based on state of the process and the requests from the procedure and/or operator. Various state models can be employed such that are also compatible with S88 standards but rigid conformance to the standard is not a requirement. In one example, a state model can be based on a packaging machine's state, where such states can be applied to the unit. Units and Machines can be considered synonymous. The unit core module can also utilize a subset of the states shown in the diagram 500. As can be appreciated, more states than shown in the diagram 500 or a completely independent state model can also be controlled and utilized.

Figure 6:
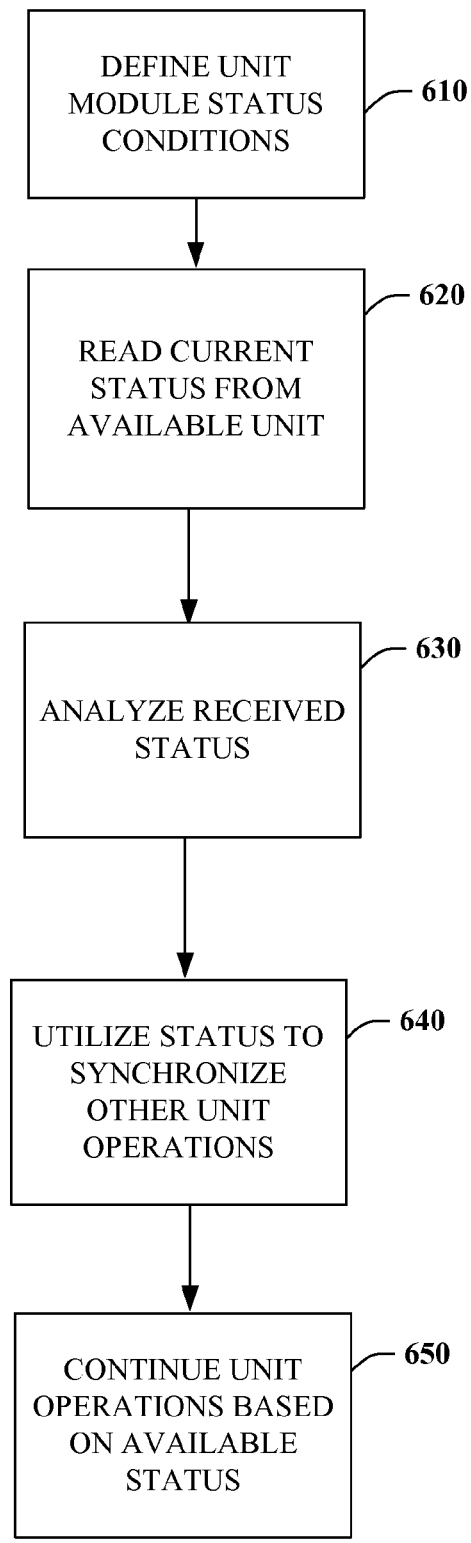
FIG. 6 is a flow diagram illustrating a module status processing methodology.

FIG. 6 illustrates a module status processing methodology 600 for an industrial automation system. While, for purposes of simplicity of explanation, the methodology is shown and described as a series of acts, it is to be understood and appreciated that the methodologies are not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology as described herein.

Proceeding to 610 of FIG. 6, various types of unit module status is defined. As noted previously, such status can include present state information such as unit availability, unit cleanliness, unit process conditions, unit quality status, batch campaign status, or an equipment performance status, for example. As can be appreciated, other types of status can also be defined. At 620, current status is read from an available unit by status components associated with a respective unit module. For example, cleanliness status may be read where it is determined that a vessel for mixing ingredients has been cleaned or other conditions of the cleanliness (e.g., washed but not rinsed, rinsed but not dry, and so forth). At 630, the present status is analyzed by a respective unit module and/or controller. The status read generally enables further operations on a unit to commence. Thus, without writing additional code to infer the status of the unit, present status read can be employed to synchronize other operations in a recipe or discrete operation as shown at 640. For example, if a vessel needed to be cleaned, cleaning operations can be commenced and determined at 630 before the vessel could be utilized at 640. At 650, further unit operations are continued based on the available status. Although not shown, the process 600 could provide monitoring paths where status is monitored during various or regular intervals of one or more process operations.

Figure 7:
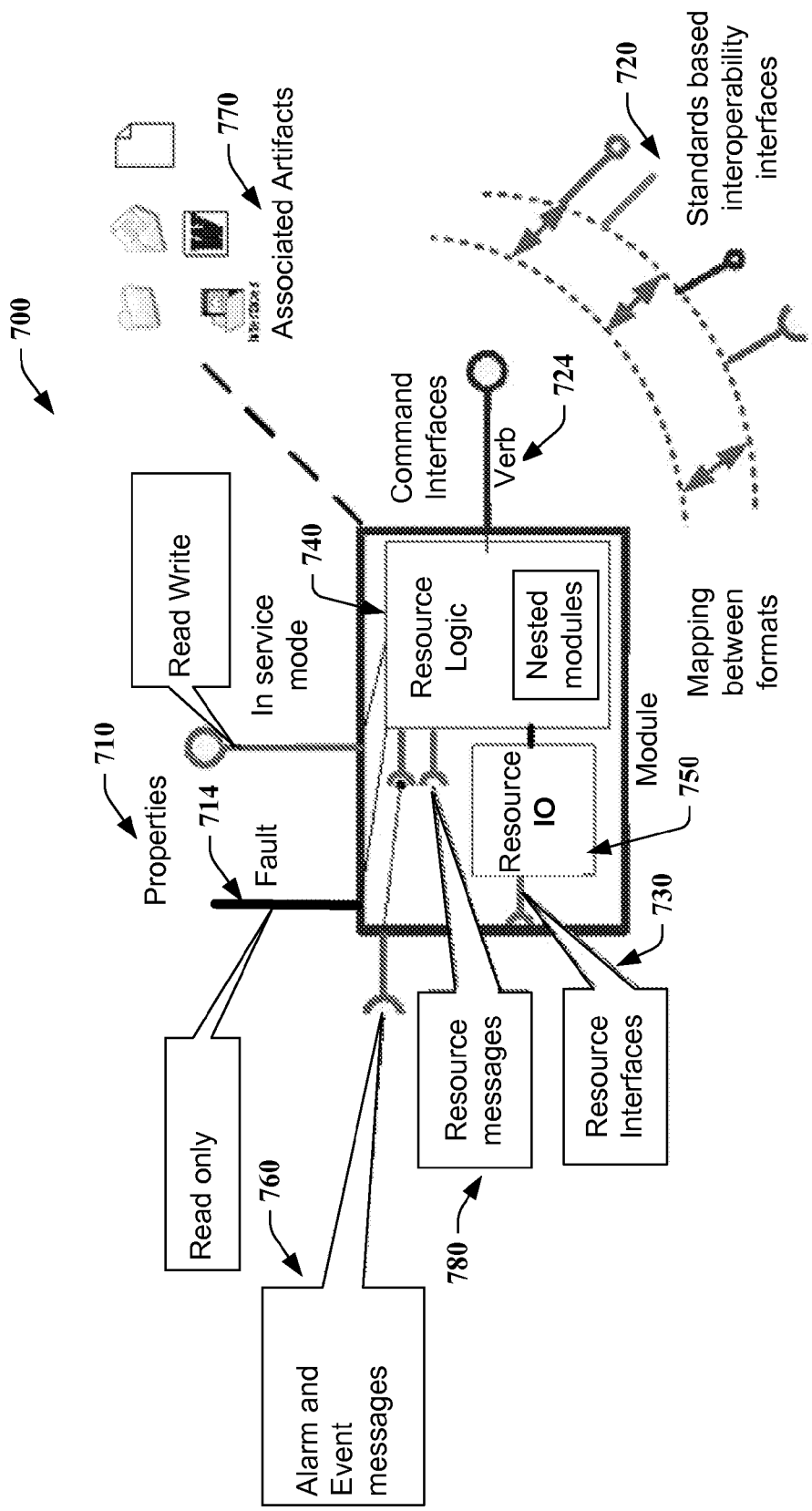
FIG. 7 is a diagram illustrating module attributes.

Referring now to FIG. 7, module attributes 700 are illustrated. The attributes 700 depicted in FIG. 7 include a common (or exemplary) representation that can be modules from modules. Generally, a set of standard attributes can be determined that are common to all modules. Similarly, for other types of modules described below, additional standard attributes can be defined. An example of a property 710 available on modules includes attributes such as Fault and Status at 714. Active resource modules (e.g., equipment and personnel) can support additional properties 710 such as available/unavailable.

Attributes presented below are represented associations from the module to objects which may be internal in a common data model or elsewhere (e.g., CAD Files). At 720, standard public interfaces can be provided. These interfaces 720 publish verbs 724 that are available to external systems and are documented activities that hide the complexity of the underlying code used to implement the interface. Interfaces 720 can be considered into at least two common usage scenarios. For example, interfaces 720 can be used as access points that can be used to hook in real time diagnostics, security and so forth.

Public verbs 724 initiate an action within the module. The activity is described to clients of the interface 720. The implementation is considered private and is not presented to clients—for example, Open, Stop, Abort, Shut, and so forth. A data value property 710 provides public access to information that is used by the module during its operation and can be provided by request values and/or internal values (or an equivalent). The association of logic to transfer request values to internal values and vice versa are referred to as get and set logic for the value. It is noted that in a controller, if there is not a set routine to transfer request values to internal values, the internal value can overwrite the request value on the next scan providing read only capability.

In general, the properties 710 can be considered in at least two classifications. States have special significance for production systems and can have a specific set of values that can be represented by range or enumeration. A state can represent the current status of the primary resource being encapsulated by the module e.g., Percent open, Mode, Service (in, out), and so forth. Information that is used by the module during its operation includes access to data that is provided by interfaces 720. e.g., Conversion Map, Name, Description, expiry date, personnel contact information. Some properties 710 can be common to all instances of resource modules (e.g., scanned copy of resource specification documents), whereas other properties 710 are specific to each module instance (e.g., Status, percent open).

At 730, internal resource interfaces include interfaces from logic 740 in the module to the resource being managed at 750, where the logic includes code and/or configuration that processes a command and/or updates state and data properties. In some cases, this can be hardware such as I/O interfaces, or in other cases it is to subordinate resource control modules that have direct interfaces. Some examples include I/O mapping, material management logic routines, and so forth. These interfaces 730 are internal to the module enabling the modules public interfaces 720 and properties 710 to be the boundary to other system components. Modules that wrap different resources but support the same public properties/interfaces can be exchanged without disrupting interfaces to other components. Generally, I/O mapping and system messaging interfaces are exposed during deployment bind processes. When bound, external interfaces 720 to runtime systems may then consider these interfaces as internal.

At 760, alarm and event messages can be provided which include messages that exposed as runtime messages visible to external systems during the execution of the module. This includes alarms and events explicitly coded by the developer and system messages promoted to be visible by external systems. At 770, one or more artifacts include information that document the operation and structure of the resource such as for example, wiring diagrams, warranties, payroll, parts supplier information, and so forth. Visualization aspects include associated graphics that present the resource state and properties to applications interacting with the resource. For example: faceplates, icons, state overlays, edit dialogs, help files. At 780, system messages allow modules to listen for and publish data model messages to external components. Inbound messages are typically used to manage modules (configure, initialize, propagate properties, and so forth) and publish messages on module activity (resource state, data model messages, and so forth).

Figure 8:
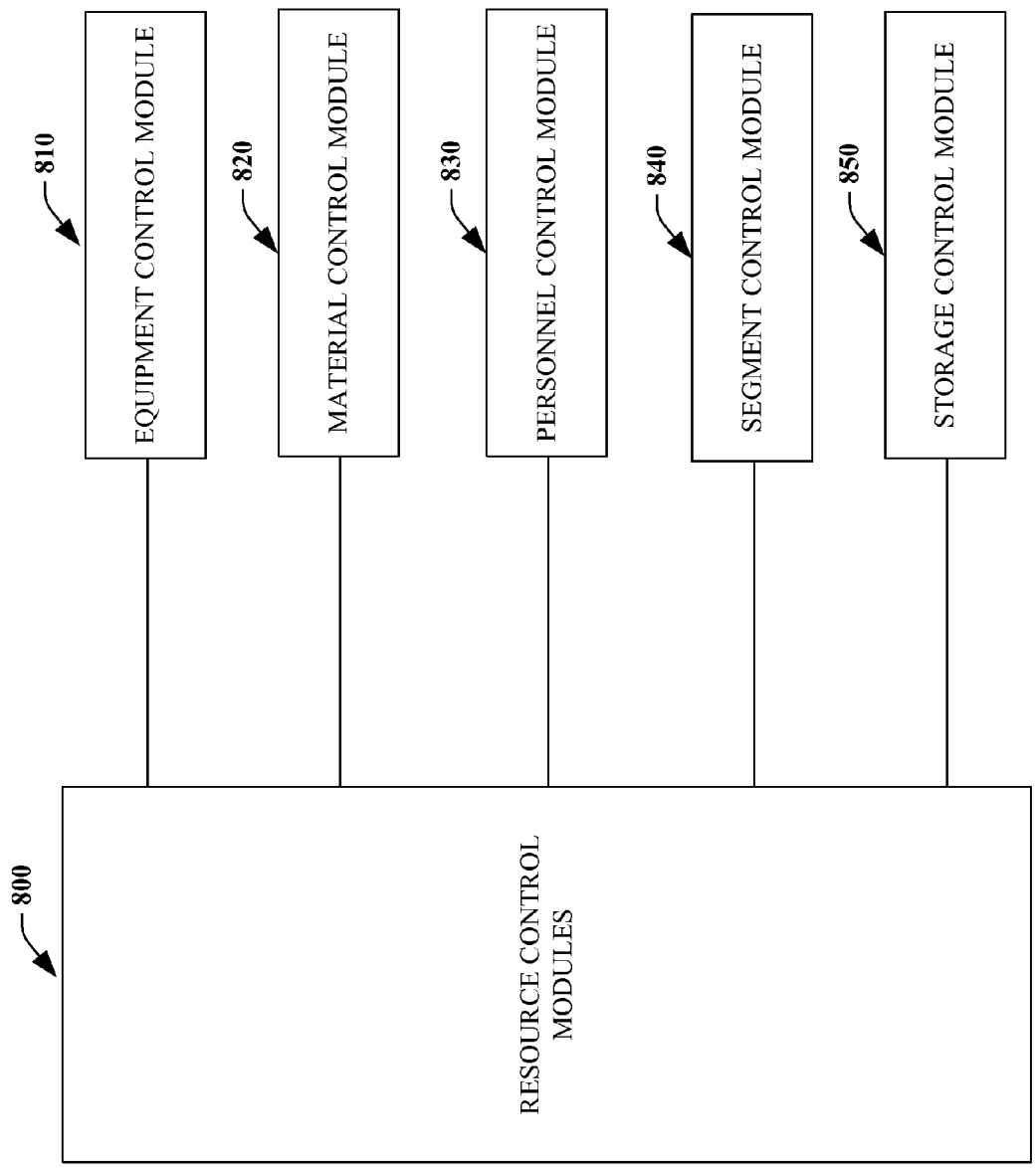
FIG. 8 is a diagram illustrating example resource control modules.

Turning to FIG. 8, example resource control modules 800 are illustrated. In general, resource control modules 800 provide simple control of one or more resources. The resource control module (RCM) 800 represents the logic to manage the state or data of the resource and may contain other resource control modules to achieve its respective functionality. The RCM 800 provides public interfaces via actions and properties. In some cases, an action may be a simple bit value or a request value that is interfaced to internal values in the module and in other cases more complex logic can be provided. The RCM 800 can include other resource control modules and may promote a command to be represented as segment resource control interface. Example forms of the RCM 800 include:

At 810, an Equipment Control Module (Common name="Control Module") CM. The simplest form of basic regulatory control of equipment. Encapsulating the equipment and its control such as control of values, drives, and so forth. At 820, a Material Control Module (MCM) can be provided. Management of Material resource instances which are represented as sub-lots including change in location, quality status, availability, order status, logic that can be performed on material sub-lots, generation of material events such as consumed, produced and moved events, sub-lot combination, expiry dates, and so forth.

At 830, a Personnel Control Module (PCM) is provided. This includes management of individual people such as Active, Idle, Break states directly or via shift schedules. This also includes data associated with people such as shift time patterns, for example. Other attributes that may be managed by PCM 830 are a person's location in a plant (GPS), qualification checks, or current assignment, for example. At 840, a Segment Control Module (SCM) includes manipulation of simple segment tasks such as piping paths, AGV paths, device state machines, robotic sequences and so forth. The SCM 840 typically performs an action on one segment such as next step to execute after the current step. At 850, a Storage Control Module (STGCM) includes Manipulation of simple storage logic such as buffer capacity and ordering into and out of a queue for the respective storage unit or requirement.

Figure 9:
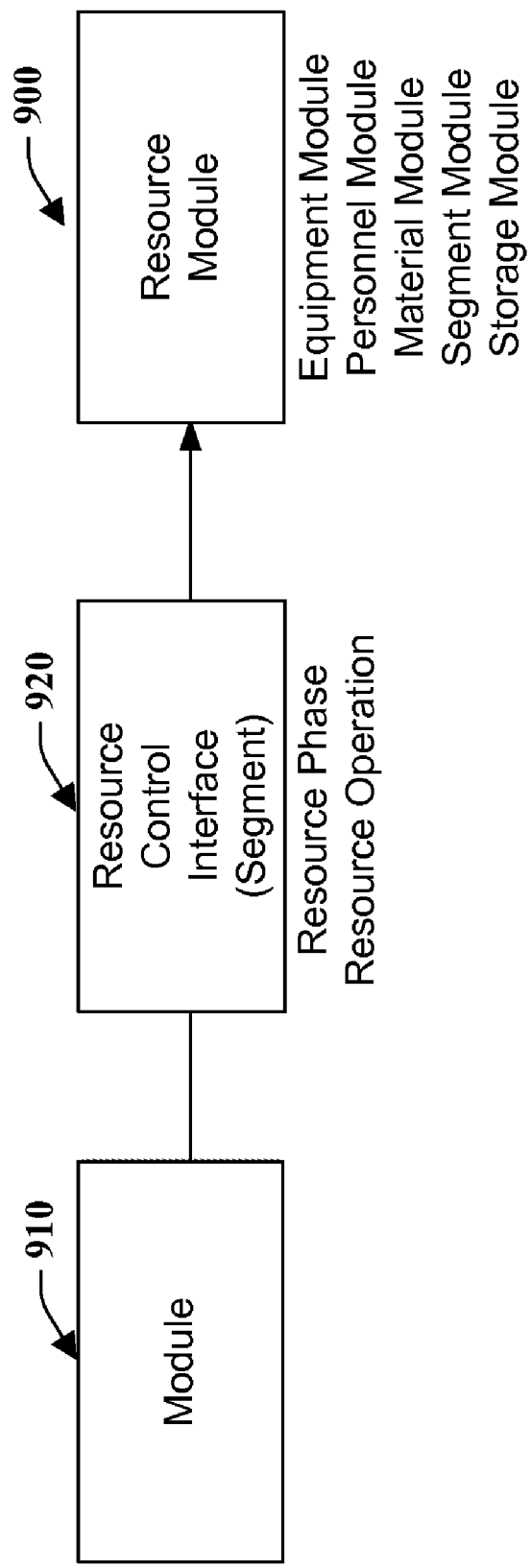
FIG. 9 is a diagram illustrating a resource module.

FIG. 9 illustrates a resource module 900 for an industrial control system. Resource modules 900 extend resource control modules described above to enable coordination of resources (equipment, people, modules and so forth) to achieve. As shown, the resource control module 900 includes a module 910 and a resource control interface 920. Resource modules 900 are also able to represent more complex activities than resource control modules. For example, resource modules may include other resource control modules at 910 and/or other resource modules. For example, an equipment module may leverage a subordinate material control module to represent material handling aspects or a segment module to solicit an electronic signature.

Before proceeding it is noted that other types of modules are possible than shown. For instance, a configuration module may include management definitions and configuration of resources—personnel, segments, equipment, segments, storage, and so forth. Another type of module includes nested modules where a module references other modules. These modules may be children of a parent module or shared from one module to another. Resource modules may include resource control modules however resource control modules should not include resource modules. Modules can include modules focused on other resource types, for example an equipment module may include equipment modules and material modules.

Figure 10:
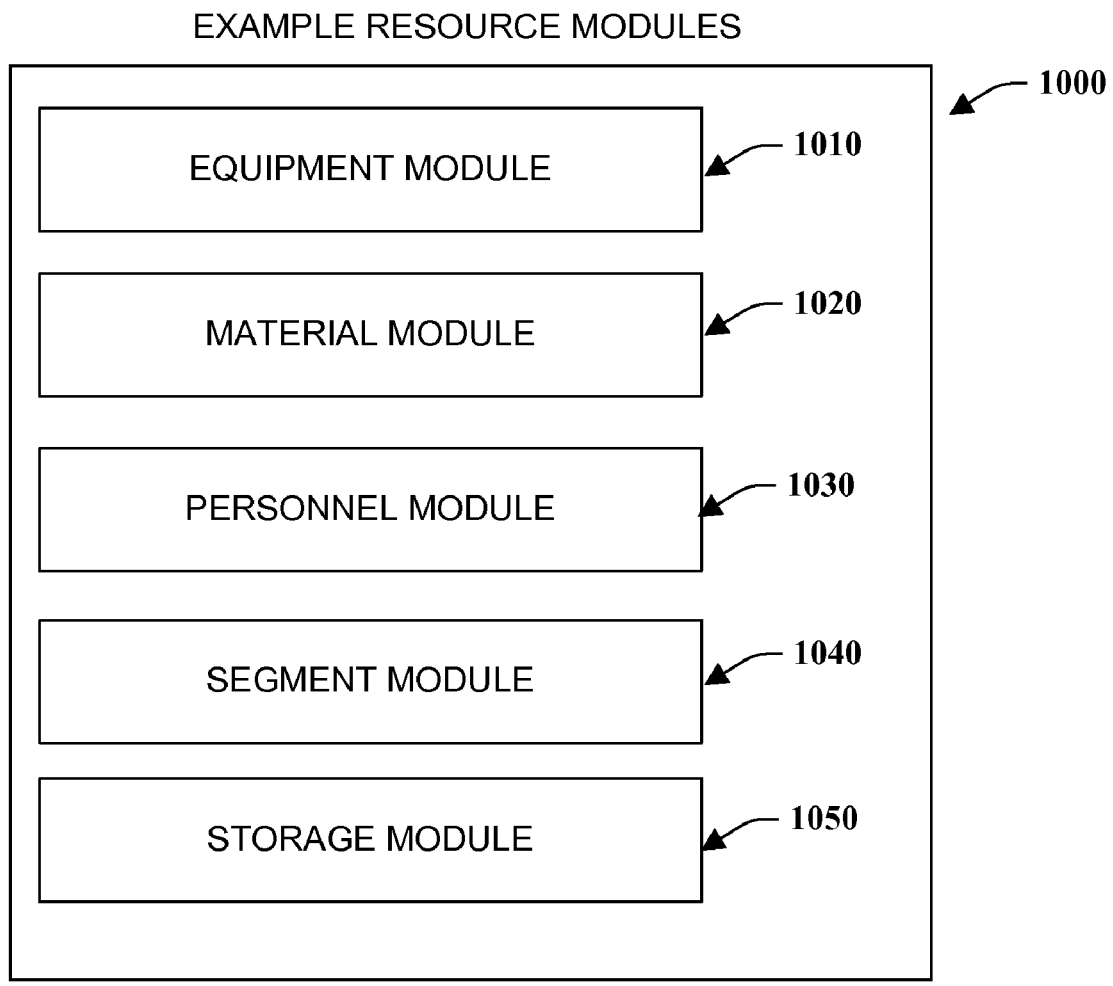
FIG. 10 is a diagram illustrating example resource modules.

FIG. 10 illustrates example resource modules 1000 for an industrial control system. At 1010, an Equipment Module provides coordination of equipment modules and equipment control modules to perform a process-orientated task independent of specific material e.g., In-feed, AGV controller, Conveyor, and so forth. At 1020, a Material Module provides coordination of material modules and material control modules to perform material focused tasks e.g., Material reservation, provision, material mass balance calculation, Bill of Material management, Work order management, and so forth. At 1030, a Personnel Module provides coordination of personnel modules and personnel control modules to perform personnel focused tasks e.g., Electronic signature collection, Security validation, certification validation, Manual control interactions, and so forth.

At 1040, a Segment Module provides coordination of segment modules and segment control modules and to execute sequences of tasks represented by segments. Segments define resource requirements and ordering that can represent most production and process activities. This module provides access to more complex tasks that require specific sequences to be followed e.g., Process Analytics Technology (PAT) integration, electronic signatures collection, defect, process deviation and fault recovery processing. The segment module 1040 may also construct a sequence to be followed that can be applied as manual, automatic or semi automatic sequences (e.g., Route, recipe execution) At 1050, a Storage Module provides coordination of storage related activities, allocation of storage to requestors, modeling of inventory calculations and so forth. This also includes interaction with higher-level systems that manage storage and inventory information.

Figure 11:
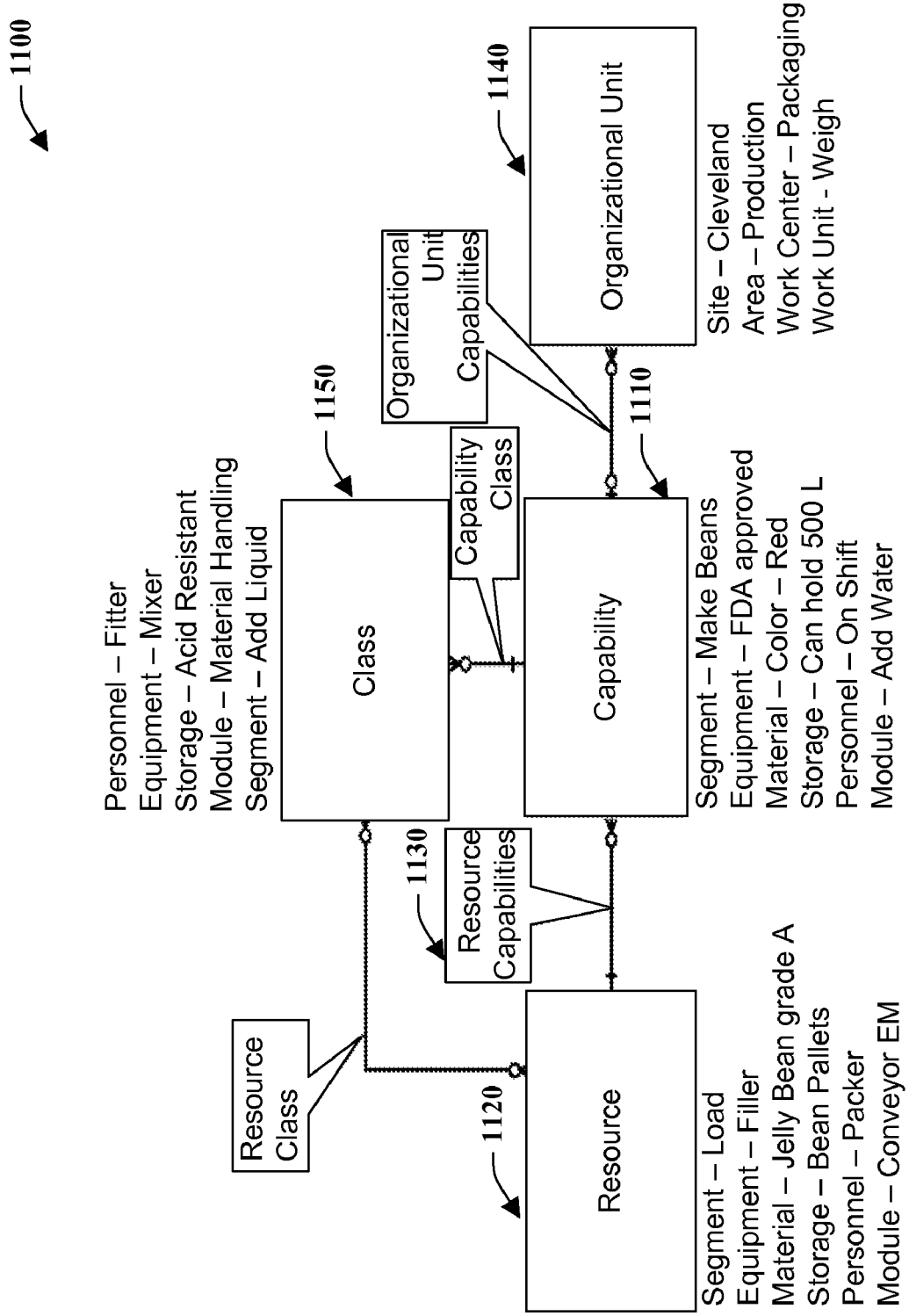
FIG. 11 is a diagram illustrating a resource control model.

FIG. 11 illustrates an example resource control model 1100 for an industrial control system. Resource Control Interfaces are the interfaces exposed to production management systems for resource binding and arbitration purposes. The interfaces are elements of the resource control model 1100 including procedures, operations or phases. These interfaces are made available by exposure via one or more capabilities 1110 described below. Procedures, operations and phases depicted in this model 1100 are commonly referred to in association with their module resource type such as Equipment Phase, Personnel Phase, Segment Phase, or as a generic Resource Phase where no specific resource module is required. Production management including Product Production Rules (production route or control recipe) physically bind to (reference) resource control phases to perform work. The availability of other resources 1120 such as material, equipment, personnel are considered during the binding process of product production rules to work centers (production lines, process cells, and so forth). These selection processes evaluate resource capabilities to locate the appropriate resource for the task.

Resource capabilities 1110 include the resource 1120 required to perform work in a production system. Consequently, resources 1120 are at the centre of, efficiency, capacity, scheduling and arbitration considerations. A resource's ability to work or be available to allow work to commence is represented as resource capability at 1130. The existence of capability 1130 associated with a resource 1120 does not make the resource available for production; the resource's capability 1130 is associated with organizational units 1140 that are will support the respective resource capability. For example, an operator (personnel resource) may have qualifications for a Mixer in line 1, where this qualification capability is only in effect with that specific mixer unless explicitly directed. Resource arbitration algorithms can search for resource capabilities 1130 in the scope of organizational units 1140 they are to be executed within.

Resources 1120 publish capabilities to organizational units 1140 for use by system processes in a given scope. Modules are a type of resource and can be accessed directly by published capabilities 1110. However, a more common interface to Resource Modules is via verbs that are supported by the Resource Module noted above. These verbs are Resource Control elements (phases, operations, procedures . . . ) which are segments. A published capability of a resource module is typically one of the phases supported the module. Resource control interfaces are published (made available) to the outside world as capabilities 1110. Resource modules provide the ability to promote a command to become a resource control interface.

Some process control systems are built using only Resource control modules (especially control modules). Examples of this are continuous processes such as petrochemical and heavy chemical plants. In order to initiate, the process takes a plant up to its running state or makes a change to the state of a series of commands that are initiated and coordinated to achieve the new state. It is also possible to promote commands from resource control modules to appear as capabilities that can be accessed as "tuning knobs" for tweaking the system between system states. As shown in the model 1100, the resource 1120 and capability can be associated with a higher-level class or abstraction 1150.

What has been described above includes various exemplary aspects. It is, of course, not possible to describe every conceivable combination of components or methodologies for purposes of describing these aspects, but one of ordinary skill in the art may recognize that many further combinations and permutations are possible. Accordingly, the aspects described herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates state processing in an industrial control environment, comprising:
  a plurality of module components that control operations in an industrial control environment; and
  a plurality of propagation components, wherein a propagation component is embedded within each of the plurality of module components, each propagation component automatically communicates control information associated with the module component in which it is embedded to at least one other module component according to a hierarchy that defines parent and child relationships amongst the module components, the control information includes at least one of fault data, mode data, reset data, or safety data.

2. The system of claim 1, wherein the control information is communicated in at least one of an upward or downward direction according to the hierarchy.

3. The system of claim 2, further comprising a component to dynamically define module relationships.

4. The system of claim 2, wherein the module component includes a unit module associated with one or more subordinate modules that include one or more equipment modules or control modules.

5. The system of claim 1, wherein the hierarchy is user configurable to selectively enable or disable propagation of control information in a defined parent and child relationship between two module components.

6. The system of claim 1, wherein the module component includes at least one of a command data structure, a state data structure, a mode control structure, an interlock structure, a simulation control, a configuration data structure, a permissive data structure, a fault data structure, an input data structure or an output data structure.

7. The system of claim 1, wherein the fault data is associated with at least one of an alarm condition or a system/module error condition.

8. The system of claim 1, wherein the reset data returns a module component to a staffing condition.

9. The system of claim 1, wherein the mode data relates to an operating mode of a system that includes at least one of manual, automatic, or semi-automatic mode.

10. The system of claim 1, wherein the propagation component allows fault, reset, mode, or safety conditions to move a module up and down the hierarchy, which allows higher level modules to perform a suitable response to a condition.

11. The system of claim 1, further comprising an acknowledgement signal to move at least one of up or down the hierarchy that mitigates the need to perform device level fault acknowledgements.

12. The system of claim 1, further comprising a configuration component to enable how modules respond to the control information.

13. The system of claim 1, wherein the safety data is associated with at least one of presence sensing devices, safety switches, interlock switches, safety relays, emergency stop devices, cable pulls, enabling switches, or safety controllers.

14. The system of claim 1, further comprising a functional safety component to communicate data at least one of up or down the hierarchy.

15. The system of claim 14, wherein the functional safety includes at least one Safety Integrity Level component and at least one performance level component.

16. The system of claim 1, further comprising at least one safety parameter that includes at least one of a probability of failure on demand, a Spirius Trip Rate, an Availability, a Mean time between failure, a fault tolerance, a diagnostic coverage, or a systematic safety integrity component.

17. The system of claim 1, further comprising a component to publish safety system data over a network to a controller.

18. The system of claim 17, wherein the controller consumes the safety system data and dynamically calculates overall safety parameters of a safety system.

19. The system of claim 18, wherein the safety system executes a tuning algorithm to facilitate that safety system remains within parameters set for a safety guideline.

20. A method to propagate states for an industrial control process, comprising:

generating one or more conditions associated with at least one of reset, fault, mode, or safety state of at least one of a plurality of modules operating in an industrial automation system; and automatically propagating the one or more conditions at least one of up or down between at least two of the plurality of modules according to a module hierarchy, wherein the module hierarchy identifies one or more parent and child relationships between the plurality of modules.

21. The method of claim 20, further comprising generating an alarm associated with the one or more conditions and propagating the alarm according to the module hierarchy.

22. The method of claim 20, further comprising selectively propagating a condition between two modules associated by a parent and child relationship according to a user defined inheritance configuration.

23. The method of claim 22, further comprising dynamically defining one or more module relationships.

24. The method of claim 22, further comprising dynamically calculating one or more safety parameters.

25. A module control propagation system, comprising:

means for defining a hierarchical organization between a plurality of modules of an automation system, wherein the hierarchical organization establishes parent and child relationships between pairs of the plurality of modules; and wherein each of the plurality of modules has embedded means for propagating control data associated with the module to another module according to the hierarchical organization, the control data including at least one of fault data, reset data, mode data, or safety data.

* * * * *

UNITED STATES PATENT AND TRADEMARK OFFICE
CERTIFICATE OF CORRECTION

PATENT NO. : 7,684,877 B2
APPLICATION NO. : 11/864664
DATED : September 28, 2007
INVENTOR(S) : N. Andrew Weatherhead and Mark K. Carmount It is certified that error appears in the above-identified patent and that said Letters Patent is hereby corrected as shown below:

In Column 14, Line 27, in Claim 8, delete "staffing" and replace with "starting".

Signed and Sealed this

Twenty-seventh Day of April, 2010

David J. Kappos
*Director of the United States Patent and Trademark Office*